US010230284B2

(12) United States Patent
Moore et al.

(10) Patent No.: US 10,230,284 B2
(45) Date of Patent: Mar. 12, 2019

(54) MOTOR ASSEMBLY WITH COMPACT GEAR DRIVE

(71) Applicant: Nidec Motor Corporation, St. Louis, MO (US)

(72) Inventors: William D. Moore, Florissant, MO (US); Joshua M. Biro, Collinsville, IL (US); Richard J. Fadler, St. Charles, MO (US); Matthew D. Allen, St. Peters, MO (US); Philip S. Johnson, Granite City, IL (US); Michael E. Moore, Lakewood Ranch, FL (US); John M. Tucker, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 65 days.

(21) Appl. No.: 15/433,923

(22) Filed: Feb. 15, 2017

(65) Prior Publication Data
US 2017/0237314 A1  Aug. 17, 2017

Related U.S. Application Data

(60) Provisional application No. 62/295,449, filed on Feb. 15, 2016, provisional application No. 62/312,301, filed on Mar. 23, 2016.

(51) Int. Cl.
*H02K 7/08* (2006.01)
*H02K 7/116* (2006.01)
*F16H 1/28* (2006.01)
*F16H 57/02* (2012.01)

(52) U.S. Cl.
CPC ............... *H02K 7/116* (2013.01); *F16H 1/28* (2013.01); *F16H 57/02* (2013.01); *H02K 7/08* (2013.01); *F16H 2057/02034* (2013.01)

(58) Field of Classification Search
None
See application file for complete search history.

(56) References Cited

U.S. PATENT DOCUMENTS

| 2,026,006 | A | * | 12/1935 | Wennerstrom | ........ | A47L 11/162 |
|---|---|---|---|---|---|---|
| | | | | | | 15/49.1 |
| 2,941,411 | A | * | 6/1960 | Wilhelm | ................ | B65G 23/08 |
| | | | | | | 198/832 |
| 4,228,794 | A | * | 10/1980 | Boller | .................... | A61H 7/001 |
| | | | | | | 601/95 |

(Continued)

FOREIGN PATENT DOCUMENTS

| EP | 2711287 | 3/2014 |
|---|---|---|
| WO | 2011-096658 | 8/2011 |

OTHER PUBLICATIONS

PCT International Search Report and Written Opinion from PCT Application No. PCT/US2017/017993 entitled Motor Assembly With Compact Gear Drive (dated May 23, 2017).

*Primary Examiner* — Dirk Wright
(74) *Attorney, Agent, or Firm* — Hovey Williams LLP

(57) ABSTRACT

An electric motor assembly includes a rotor, a stator, and a gear assembly. The gear assembly includes a drive gear, a ring gear, and an intermediate gear disposed between and engaging each of the drive gear and the ring gear. The gear assembly further includes a carrier supporting the intermediate gear and being fixed relative to the stator so as to be stationary relative thereto. The ring gear is rotatable relative to the carrier and the stator.

27 Claims, 16 Drawing Sheets

(56) References Cited

U.S. PATENT DOCUMENTS

| | | | |
|---|---|---|---|
| 4,692,049 A | 9/1987 | Engle | |
| 5,267,915 A | 12/1993 | Estabrook | |
| 5,732,813 A * | 3/1998 | Nielsen | B65G 23/08 198/788 |
| 6,607,049 B2 | 8/2003 | Cigal | |
| 6,702,070 B2 | 3/2004 | Smith | |
| 6,846,258 B2 * | 1/2005 | Aoki | B60L 11/14 192/207 |
| 7,510,073 B2 * | 3/2009 | Kanaris | B65G 23/08 198/780 |
| 7,527,113 B2 * | 5/2009 | Jenkins | B60K 7/0007 180/308 |
| 7,530,416 B2 * | 5/2009 | Suzuki | B60K 7/0007 180/65.51 |
| 7,641,010 B2 * | 1/2010 | Mizutani | B60K 7/0007 180/65.1 |
| 7,806,252 B2 * | 10/2010 | Kanaris | B65G 23/08 198/788 |
| 8,123,047 B2 * | 2/2012 | Keller | B01D 33/15 210/411 |
| 8,795,130 B2 | 8/2014 | Forrest | |
| 8,833,497 B2 * | 9/2014 | Shibukawa | B60K 17/046 180/65.6 |
| 9,243,690 B2 | 1/2016 | Forrest | |
| 9,752,652 B2 * | 9/2017 | Moore | F16H 1/10 |
| D800,198 S | 10/2017 | Branning et al. | |
| 2008/0045374 A1 | 2/2008 | Weinberg et al. | |
| 2008/0236908 A1 | 10/2008 | Cooper et al. | |
| 2015/0273940 A1 | 10/2015 | Forrest | |
| 2015/0274287 A1 | 10/2015 | Robertson et al. | |
| 2017/0114883 A1 * | 4/2017 | Hutsler | F01C 1/084 |

* cited by examiner

MOTOR ASSEMBLY WITH COMPACT GEAR DRIVE

CROSS-REFERENCE TO RELATED APPLICATIONS

1. Priority Applications

The present application claims priority from U.S. Provisional Patent Application No. 62/295,449, filed Feb. 15, 2016, and entitled LOW AXIAL PROFILE LOCOMOTION MOTOR, and U.S. Provisional Patent Application No. 62/312,301, filed Mar. 23, 2016, and entitled OUTER ROTOR MOTOR, the entire disclosure of each of which is hereby incorporated by reference herein.

BACKGROUND

1. Field

The present invention relates generally to electric motors. More particularly, preferred embodiments of the present invention concerns low axial profile locomotion motors, although other motor types are suitable. Embodiments of the motor assembly are preferably used in an automated guided vehicle and in an overhead fan, although other applications of the motor assembly are also contemplated.

2. Discussion of the Prior Art

Those of ordinary skill in the art will appreciate that a variety of considerations are integral to electric motor design and ensuing performance. Such considerations may be directed at features including but not limited to operational efficiency, power or torque, noise, sealing, ease of assembly, cost, motor envelope, and manufacturing techniques.

It is known in the art for a conventional gearmotor to include an electric motor that drives a planetary gear drive. One conventional device includes a gear ring that is fixed to the motor housing and a central output shaft. Known gearmotors are used in various applications, such as vehicles, automated devices, dishwashers, washing machines, exercise equipment, and pumps.

However, known gearmotors have various deficiencies. For instance, conventional gearmotors (particularly those that employ a planetary gear system) are relatively expensive and produce excessive amounts of noise. Such gearmotors also present an axial device length that is too large for use in some applications. Yet further, known gearmotors having a planetary gear system are generally restricted to large gear ratios.

SUMMARY

The following brief summary is provided to indicate the nature of the subject matter disclosed herein. While certain aspects of the present invention are described below, the summary is not intended to limit the scope of the present invention.

Embodiments of the present invention provide motor assembly that does not suffer from the problems and limitations of the prior art gearmotors set forth above.

According to one aspect of the present invention, an electric motor assembly broadly includes a rotor rotatable about a rotor axis, a stator, and a gear assembly. The gear assembly includes a drive gear, a ring gear, an intermediate gear, and a carrier. The ring gear at least substantially circumscribes the drive gear. The intermediate gear is disposed between and engages each of the drive gear and the ring gear. The carrier supports the intermediate gear and is fixed relative to the stator so as to be stationary relative thereto. The ring gear is rotatable relative to the carrier and the stator.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with regard to the attached drawing figures, wherein.

Figure 12:
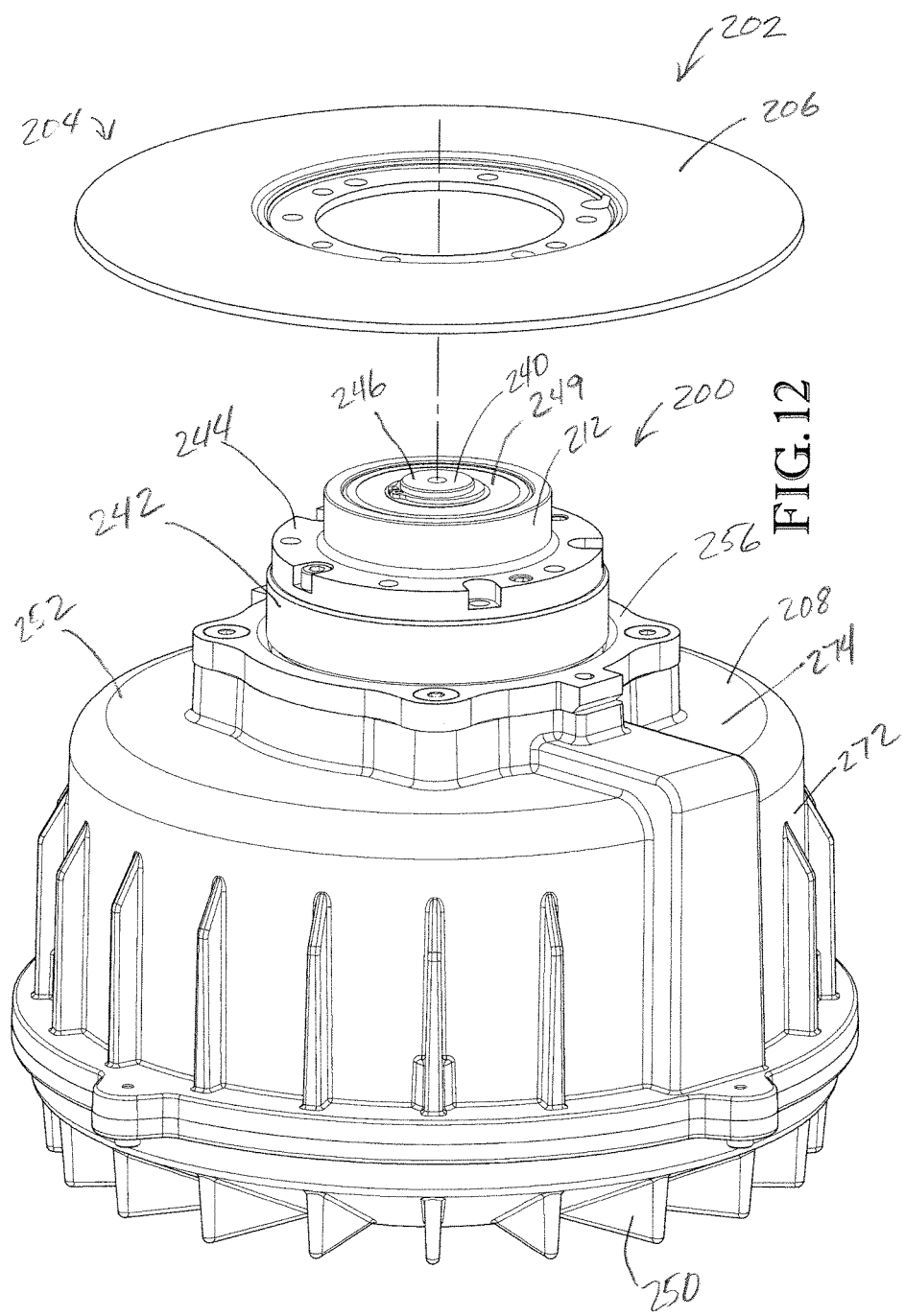
FIG. 12 is a fragmentary perspective of an overhead fan constructed in accordance with a second preferred embodiment of the present invention, and showing a fan hub exploded from a motor assembly.
Figure 13:
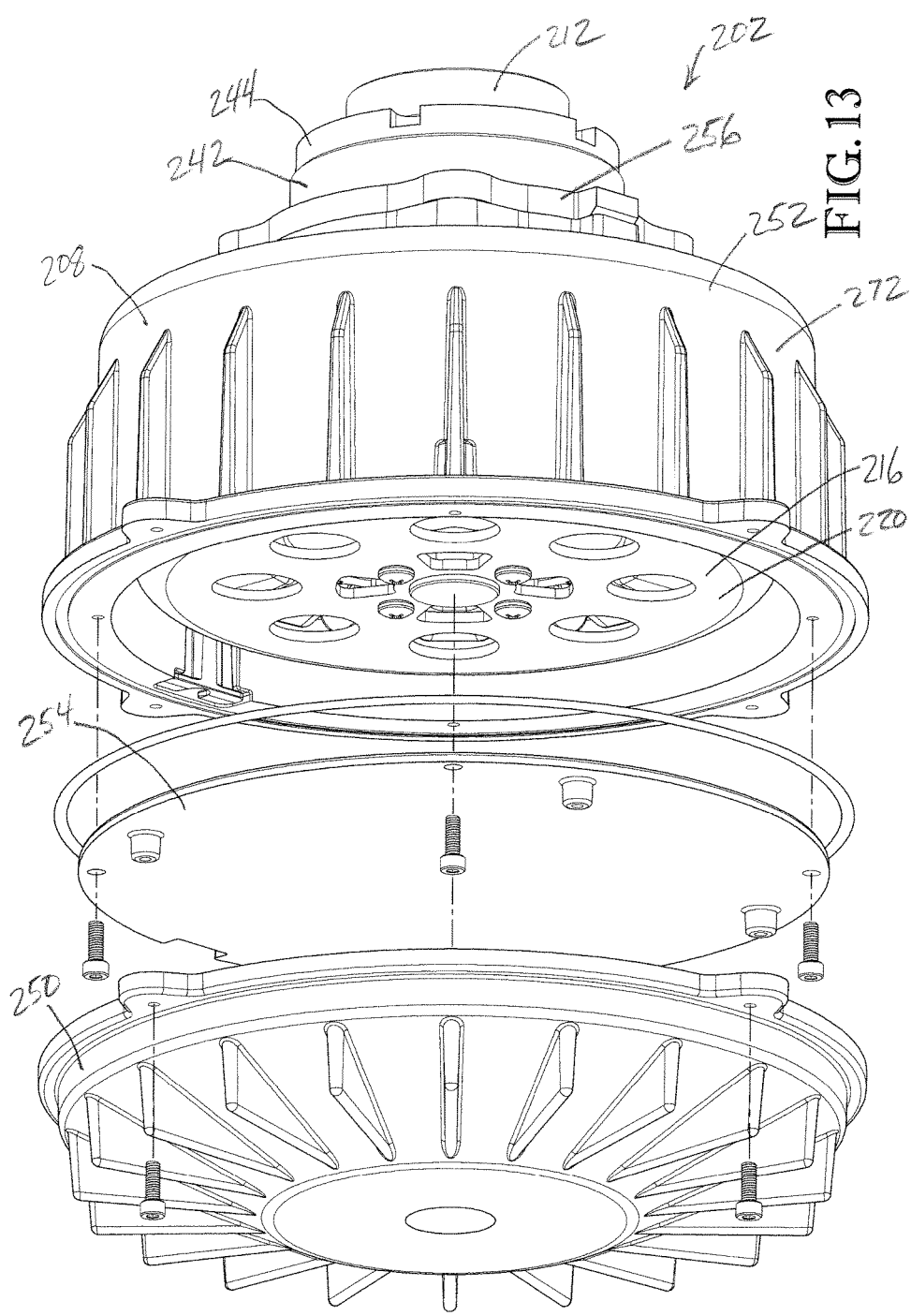
FIG. 13 is an exploded perspective of the motor assembly shown in FIG. 12, showing a cover and control board removed from a lower housing section of the motor assembly.
Figure 14:
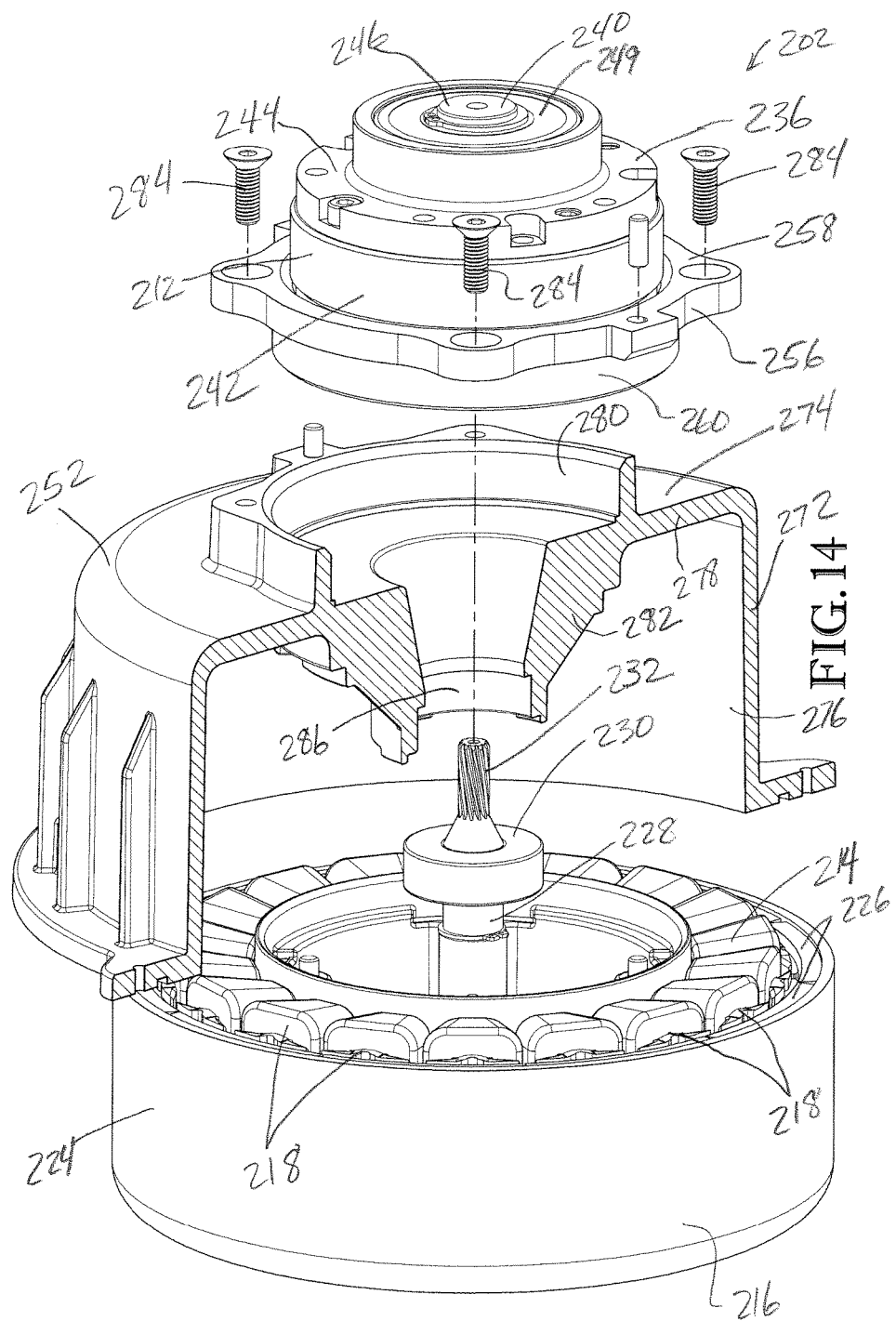
FIG. 14 is a fragmentary exploded view of the motor assembly shown in FIGS. 12 and 13, showing a stator and an outer rotor exploded from the lower housing section, and further showing an endshield and gear assembly exploded from the lower housing section.
Figure 15:
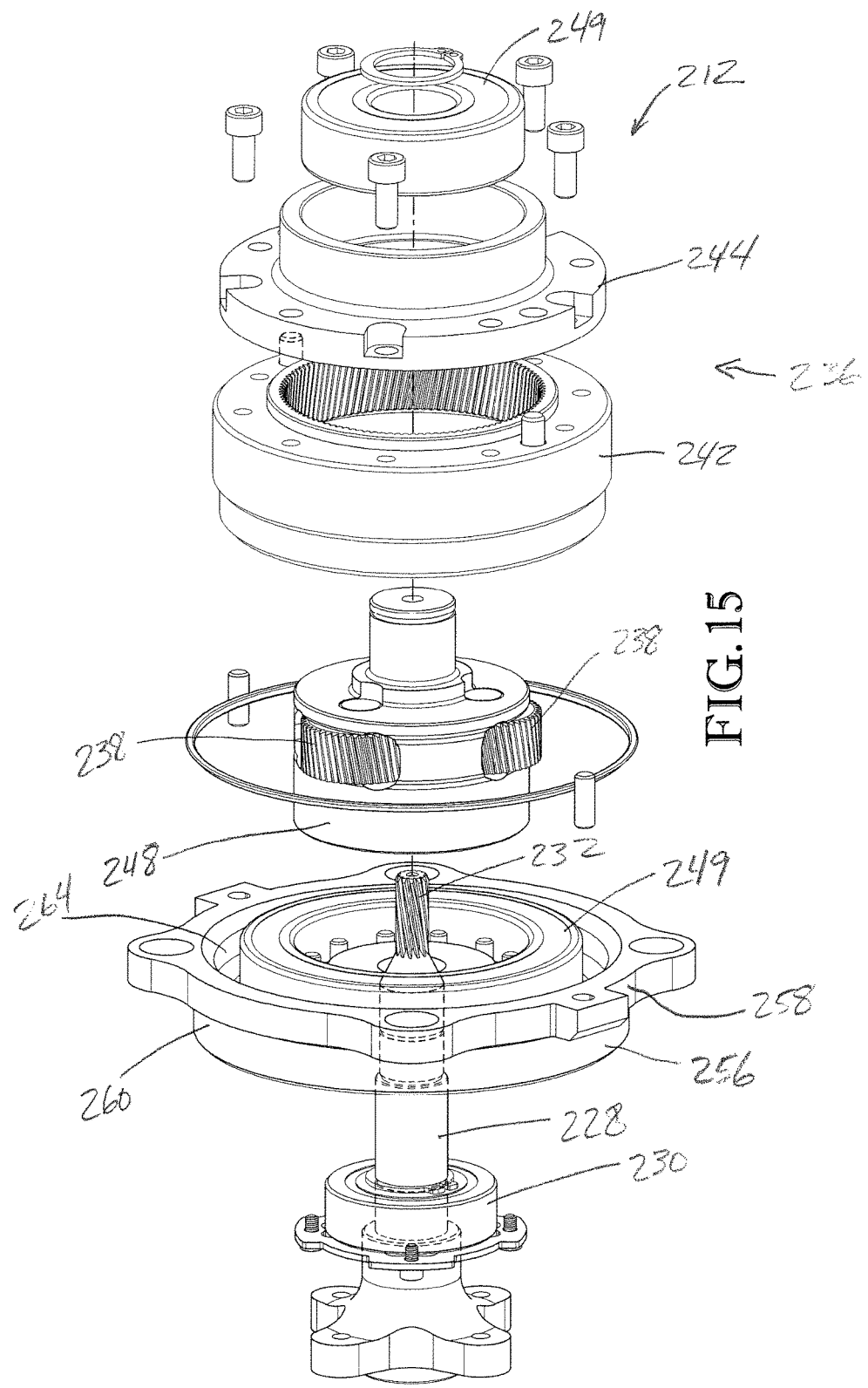
Figure 16:
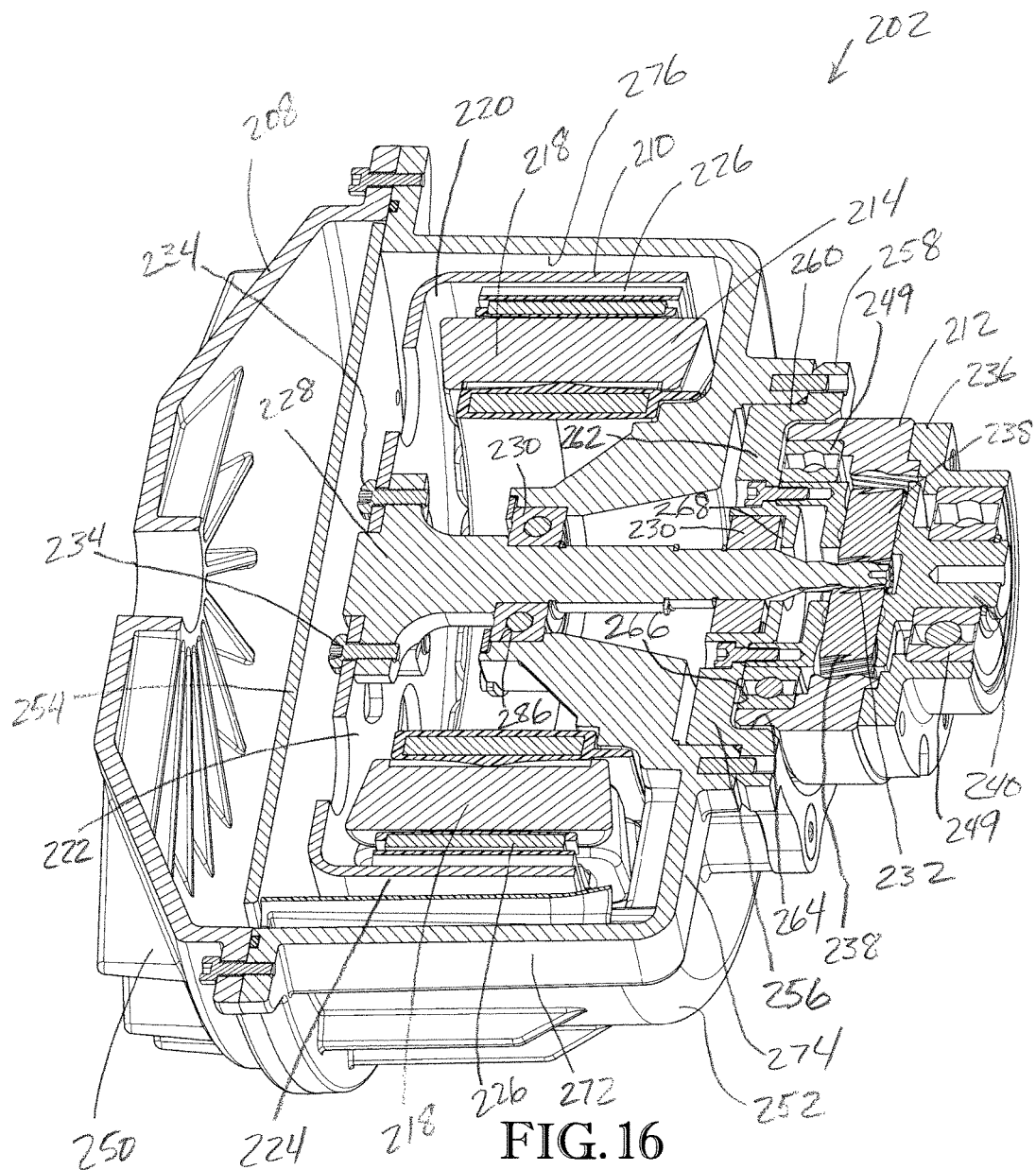

FIG. 15 is a fragmentary exploded view of the motor assembly shown in FIGS. 12-14, showing the gear assembly exploded to illustrate the ring gear, intermediate gears, carrier, and bearings of the gear assembly; and FIG. 16 is a perspective cross section of the motor assembly shown in FIGS. 12-15, showing the outer rotor in a circumscribing arrangement relative to the stator and drivingly engaged with the gear assembly.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

Traction Assembly—First Preferred Embodiment

Figure 1:
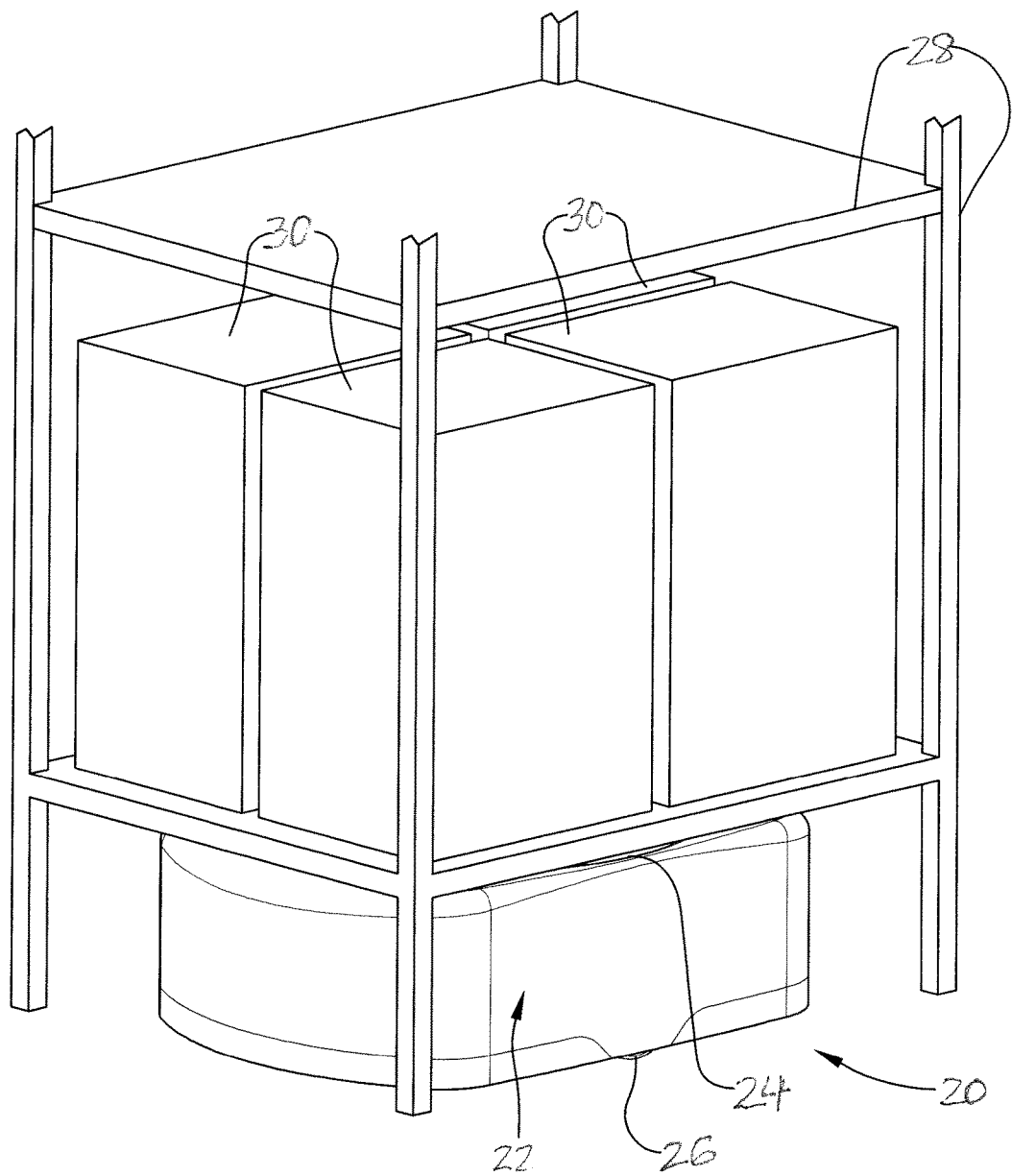
FIG. 1 is a fragmentary perspective of a robot constructed in accordance with a first preferred embodiment of the present invention, showing the robot in use to transport shelving and goods.
Figure 2:
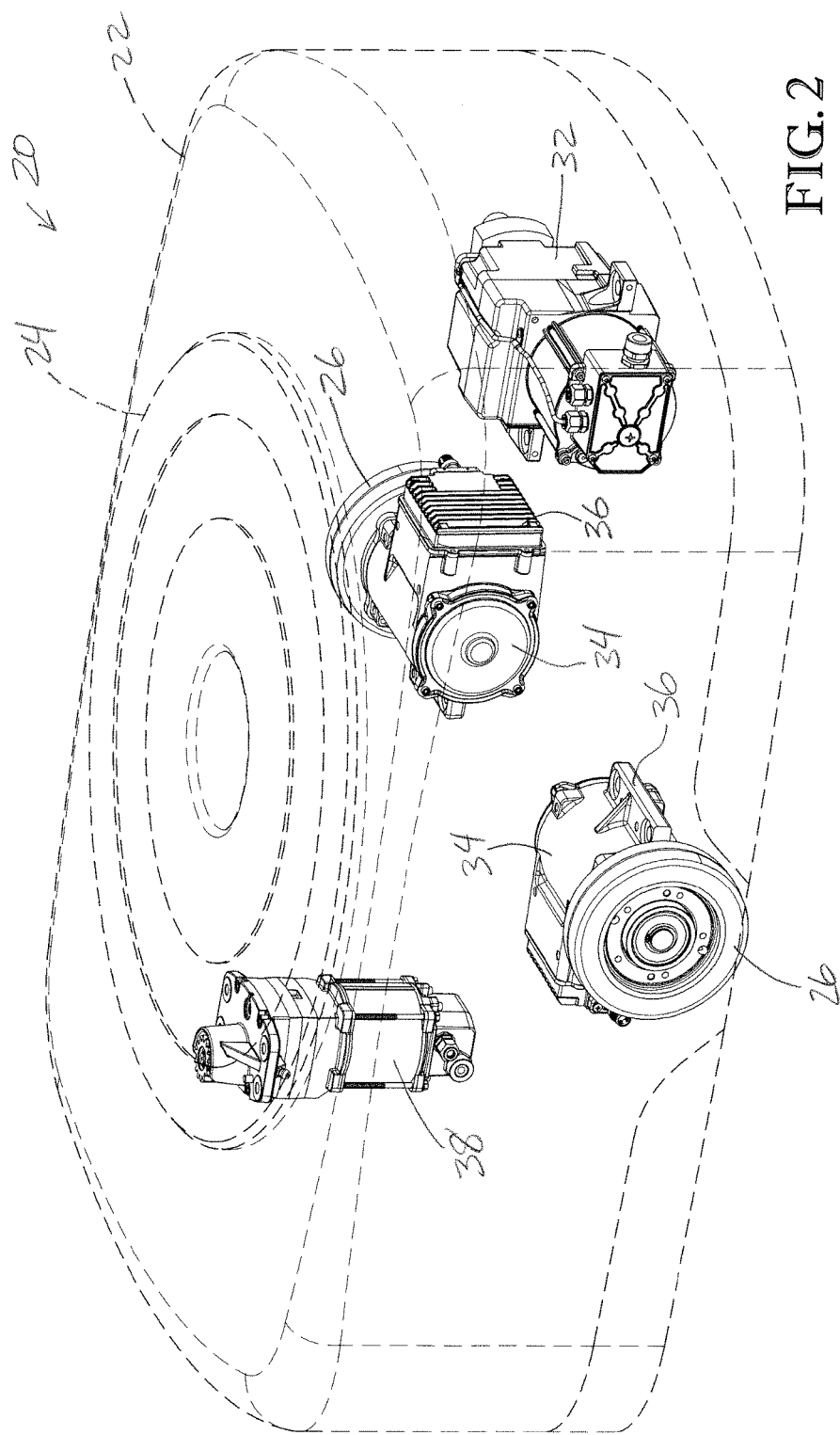
FIG. 2 is a perspective of the robot shown in FIG. 1, showing a pair of traction assemblies used to drive the robot along a floor, with each traction assembly including a housing, an electric motor, a gear assembly, and a wheel.
Figure 3:
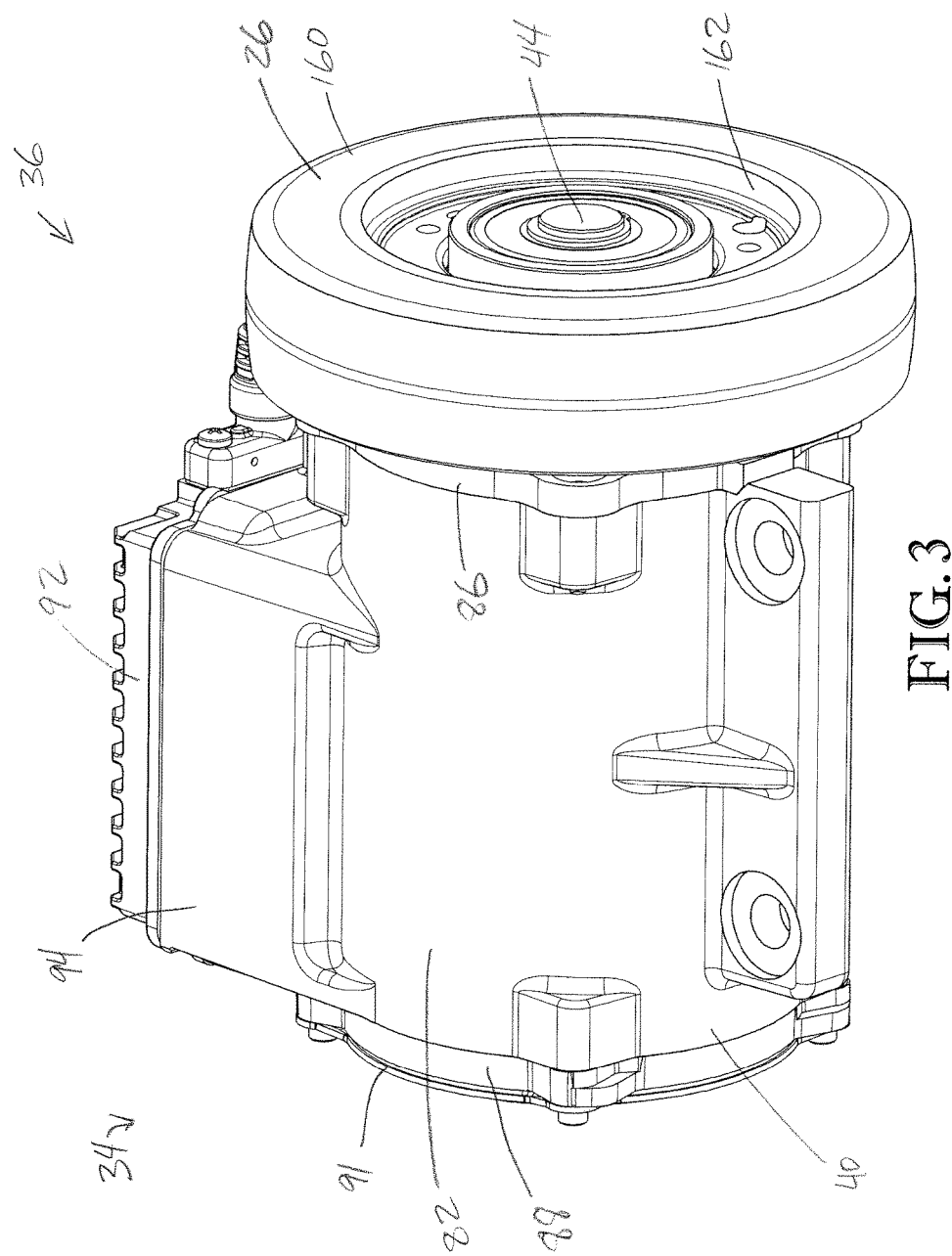
FIG. 3 is a perspective of one of the traction assemblies shown in FIG. 2.
Figure 4:
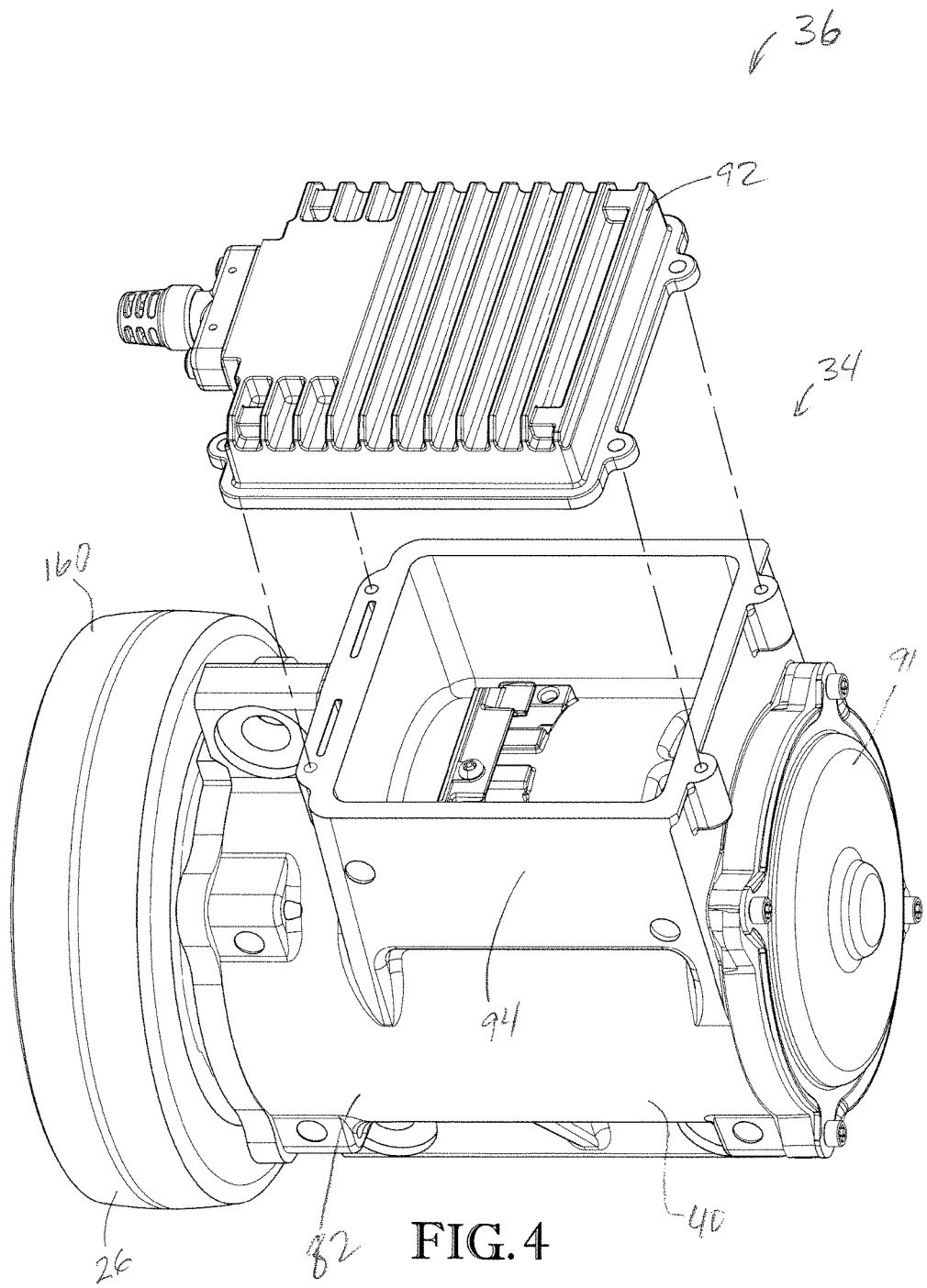
FIG. 4 is a perspective of the traction assembly similar to FIG. 2, but taken from the opposite side, showing a cover separated from a junction box of the housing shell.

Turning initially to FIGS. 1 and 2, a robot 20 is constructed in accordance with a first preferred embodiment of the present invention. The robot 20 preferably includes a main body 22 supported on a chassis (not shown), a support platform 24, and a pair of wheels 26 enabling the robot 20 to have a zero-turn radius.

The robot 20 is preferably configured to transport goods in a warehouse environment. For instance, in a preferred embodiment, the robot 20 is configured to transport shelving 28 and various goods 30 supported thereon through the warehouse environment. More particularly, the robot 20 is preferably operable at least to (1) lift the shelving 28 and associated goods 30 on the platform 24; (2) rotate at least a portion of the platform 24 so as to appropriately orient the shelving 28 and goods 30 supported by the platform 24; (3) transport the shelving 28 and goods 30 on the platform 24 from one location to another in the warehouse, making use of the wheels 26; (4) deposit the shelving 28 and goods 30 at their new location through lowering of the platform 24; and (5) completely disengage from the shelving 28 and goods 30 via lowering of the platform 24 so as to no longer be in contact with the shelving 28 and/or goods 30.

The robot 20 is preferably provided with numerous features to enable such operation, including but not limited to one or more printed circuit boards, sensors, cameras, and communication devices. A control system (not shown) is also preferably provided to control each robot 20 and to synchronize operation of multiple robots 20 in a warehouse. The robot 20 is preferably battery-powered and rechargeable.

In a preferred embodiment, the robot 20 includes four (4) motors: a lift motor assembly 32 operable to raise the platform 24, preferably but not necessarily with the assistance of a scissor lift mechanism or other lifting aid (not shown); a pair of locomotion motor assemblies 34, each of which is associated with a respective one of the wheels 26 to form a traction assembly 36, and which cooperatively enable the robot 20 to travel through the warehouse; and a turntable motor assembly 38 operable to rotate and stabilize at least a portion of the platform 24.

Although the locomotion motor assemblies 34 are preferably part of the robot 20, it is within the scope of the present invention for the motor assemblies 34 to be provided in an alternative application. For instance, the locomotion motor assemblies 34 might instead be provided for use in an electric vehicle for human transport.

Turning to FIGS. 3-11, the locomotion motor assembly 34 is configured to selectively drive the corresponding wheel 26. The locomotion motor assembly 34 preferably includes a housing 40, an electric motor 42, and a gear assembly 44 (see FIG. 9). The illustrated electric motor 42 includes a stator 46, a rotor 48, and an encoder wheel 50.

Stator Overview

Figure 5:
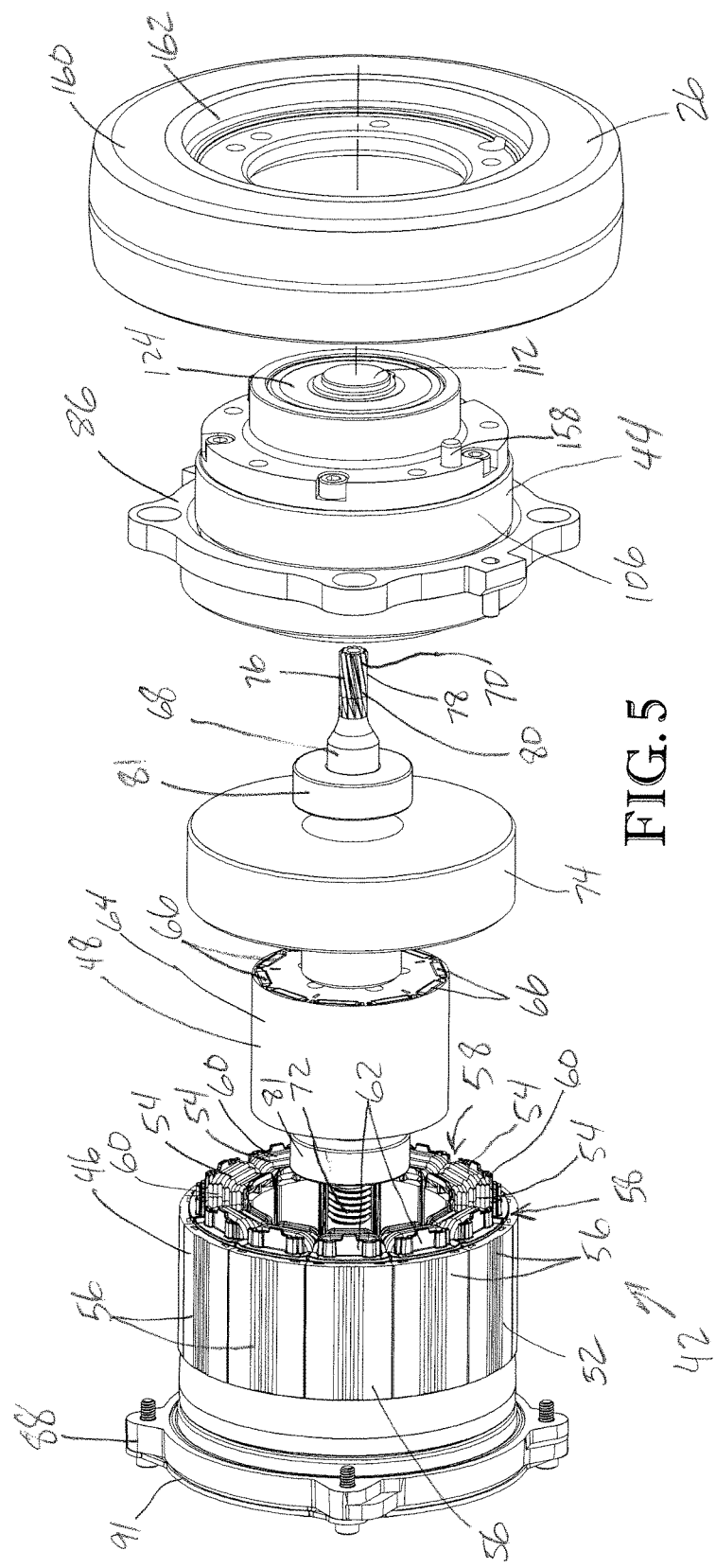
FIG. 5 is a fragmentary exploded view of the traction assembly shown in FIGS. 2-4, showing the gear assembly, and a rotor and stator of the electric motor, with endshields of the housing being spaced apart.
Figure 9:
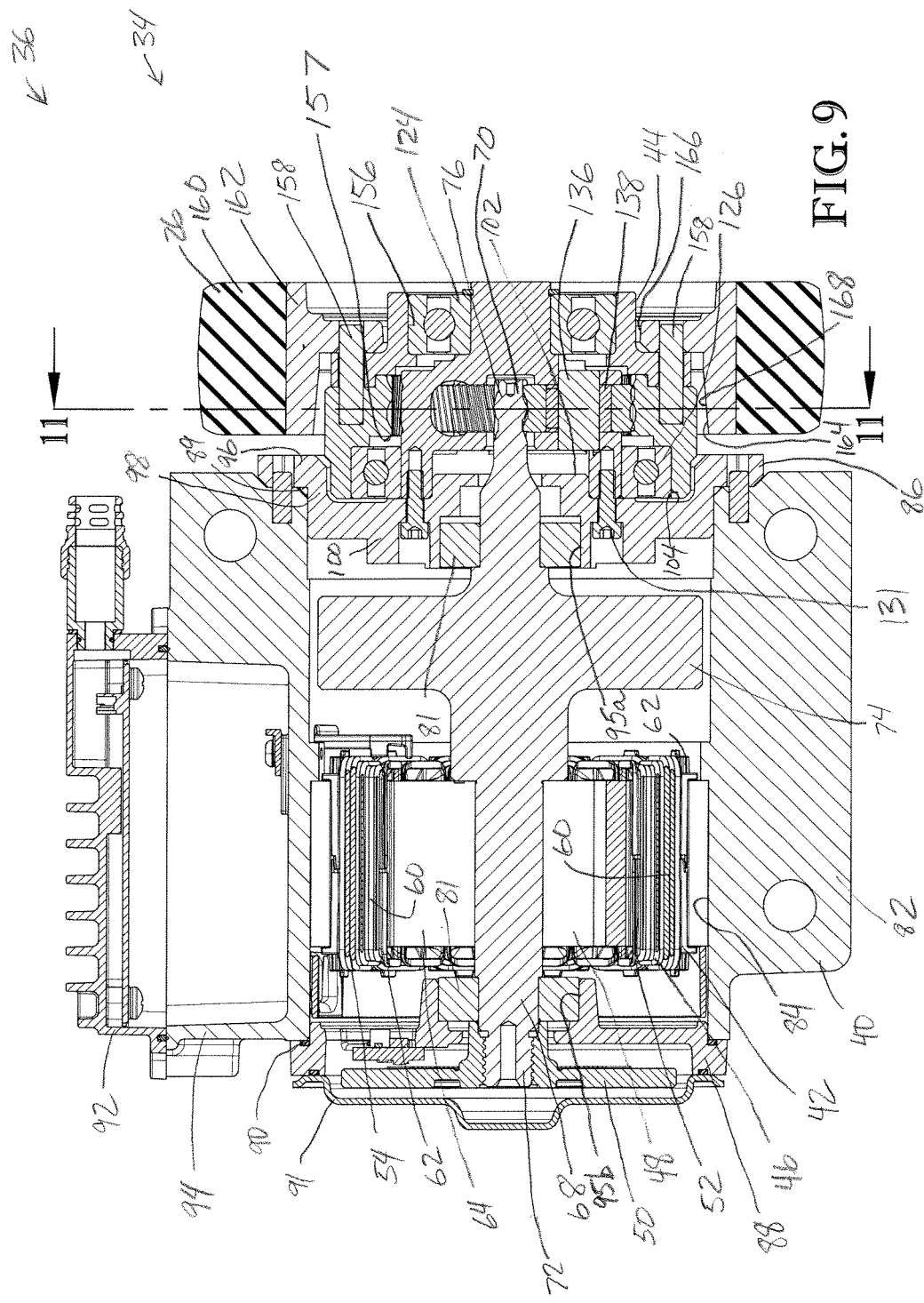
FIG. 9 is a cross section of the traction assembly shown in FIGS. 2-8.
Figure 10:
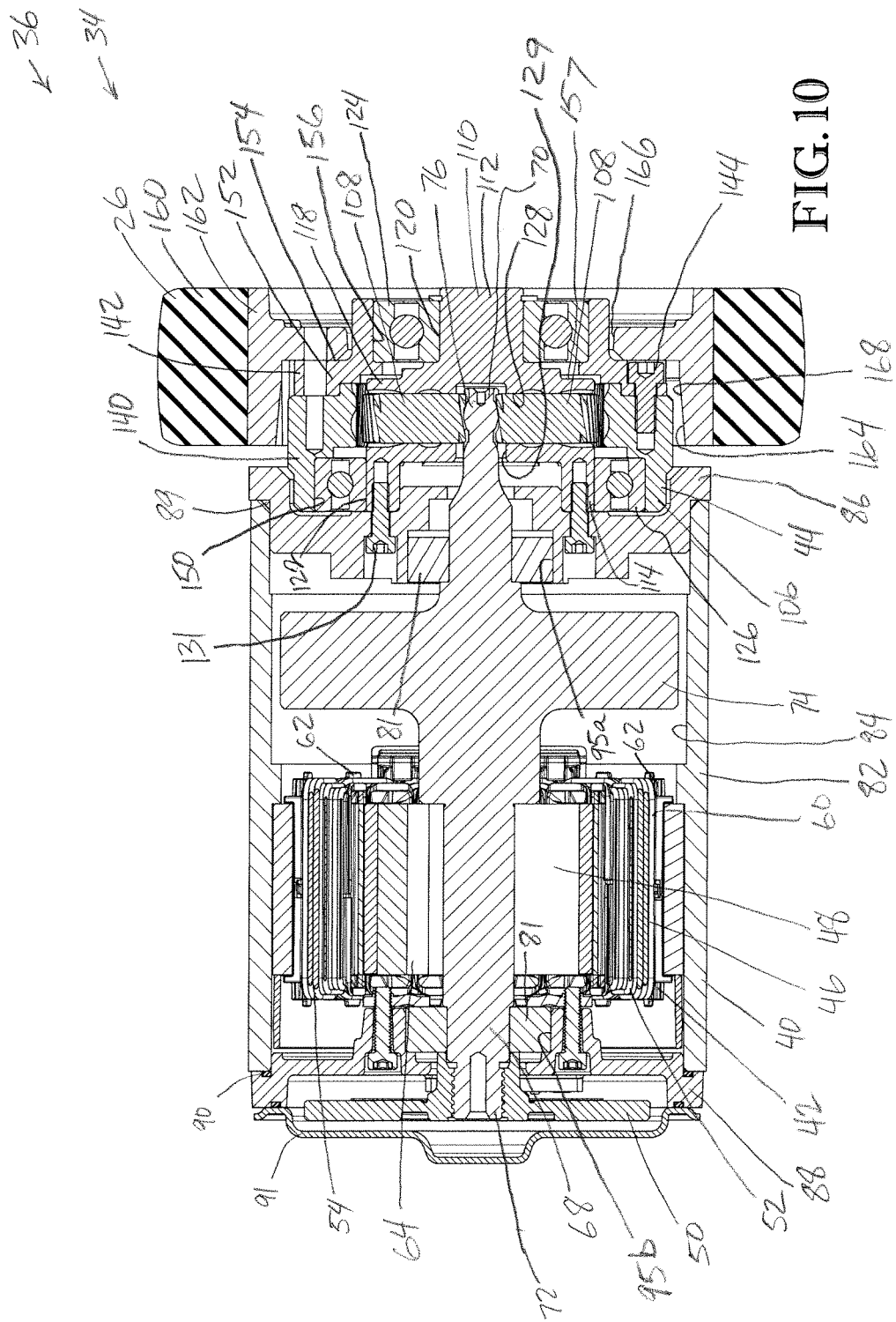
FIG. 10 is another cross section of the traction assembly similar to FIG. 9, but taken along another cross-sectional line.

As best shown in FIGS. 5, 9, and 10, the stator 46 preferably includes a generally toroidal stator core 52 and a plurality of coils 54 wound about the stator core 52. The stator core 52 is preferably a laminated stator core, although it is permissible for the stator core to be non-laminated. The stator core 52 preferably comprises a ferromagnetic material such as steel, although use of any one or more electrically conductive materials is permissible without departing from the scope of the present invention.

The stator core 52 preferably includes a plurality of arcuately spaced apart teeth 56 (see FIG. 5). The illustrated coils 54 are wound about arms of the teeth 56. More particularly, a slot 58 is defined between each adjacent pair of teeth 56. The coils 54 are preferably wound about the teeth 56 and through the slots 58 so as to circumscribe respective ones of the arms.

The coils 54 preferably comprise electrically conductive wiring 60 wound multiple times about one or more of the teeth 56 to form a plurality of turns or loops (see FIG. 5). The wiring 60 is preferably formed of copper or aluminum, although any one or more of a variety of electrical conductive materials or a combination thereof may be used within the ambit of the present invention.

The depicted stator core 52 is provided with electrically insulative endcaps 62 fitted over portions of the teeth 56. Each endcap 62 preferably comprises an at least substantially electrically insulative material. For instance, each endcap 62 may be formed of a plastic or synthetic resin material.

Each endcap 62 preferably provides both a physical and electrical barrier between the coils 54 and the stator core 52, with a pair of endcaps 62 fitted over opposite axial sides of a corresponding tooth 56.

However, it is noted that use of any one or more of a variety of insulation means, including but not limited to the use of electrically insulative overmolding, powder-coating, and/or liners, is permissible according to some aspects of the present invention. It is also permissible according to some aspects of the present invention for the stator core to be devoid of electrical insulation.

Rotor Overview

Referring again to FIGS. 5, 9, and 10, the rotor 48 preferably includes a rotor core 64, a plurality of arcuately arranged magnets 66, and a motor shaft 68.

The rotor core 64 is preferably a laminated rotor core, although it is permissible for the rotor core to be non-laminated. The rotor core 64 preferably comprises a ferromagnetic material such as steel, although use of any one or more electrically conductive materials is permissible without departing from the scope of the present invention.

The rotor core 64 is preferably generally decagonal in cross-section so as to define ten (10) magnet-mounting faces, although other shapes (e.g., round or hexagonal) and numbers of faces are permissible according to some aspects of the present invention. The magnets 66 are preferably mounted to corresponding ones of the magnet-mounting faces through use of a glue or adhesive. Alternative means of securing the magnets fall within the scope of the present invention.

The magnets 66 are preferably high-grade rare earth magnets. Other magnet types may be used without departing from some aspects of the present invention, however. For instance, according to some aspects of the present invention, the magnets might be of a lower grade and/or comprise ferrite.

In a preferred embodiment, the magnets 66 include nickel-copper-nickel plating. Alternative plating or no plating is permissible, however.

Turning to FIGS. 5 and 7-10, the motor shaft 68 presents opposite shaft ends 70,72 and includes a flywheel 74 spaced between the ends 70,72. The flywheel 74 is integrally formed as part of the shaft 68, although the flywheel 74 could be alternatively attached to the rest of the shaft 68 (e.g., where the flywheel 74 is removably mounted on the shaft 68).

The illustrated flywheel 74 is located between the rotor core 64 and the shaft end 70. However, the flywheel 74 could be positioned on the opposite side of the rotor core 64 without departing from the scope of the present invention. For instance, the flywheel 74 could be mounted adjacent the shaft end 72. In one such alternative embodiment, the flywheel 74 could also include features of, and operate as, the encoder wheel 50. Furthermore, for some aspects of the present invention, the motor assembly could be devoid of a flywheel.

The motor shaft 68 also preferably presents a drive gear 76 of the gear assembly 44. The depicted drive gear 76 comprises a pinion gear including a plurality of helical gear teeth 78 that form a toothed surface 80. The scope of the present invention is also applicable where the drive gear 76 presents an alternative tooth shape for intermeshing engagement with other gears of the gear assembly.

The illustrated drive gear 76 is located at the shaft end 70 and is integrally formed with the shaft 68. This construction of the drive gear 76 is one aspect of the motor assembly 34 enabling a compact axial profile. It is also within the ambit of the present invention where the drive gear 76 is alternatively connected to the shaft 68. For instance, the drive gear could be removably mounted on the shaft (e.g., where the shaft has a splined end that slidably receives the drive gear). Yet further, the shaft and the drive gear could be interconnected by one or more drive elements. In such alternative embodiments, the shaft and drive gear could be drivingly connected by a gear drive, a chain-and-sprocket drive, or another drive mechanism.

The illustrated shaft 68 is rotatably supported on the housing 40 by bearings 81 mounted adjacent to corresponding shaft ends 70,72. The illustrated bearings 81 are preferably ball bearing assemblies, although other suitable types of bearings (e.g., journal bearings, bushings, roller bearings, etc.) may be used without departing from the spirit of the present invention. It will be further understood that an alternative bearing arrangement could be used to support the rotor 48 without departing from the scope of the present invention.

Housing

Turning to FIGS. 3, 4, 9, and 10, the housing 40 preferably includes a motor shell 82 at least substantially circumscribing the stator 46 and in part defining a motor chamber 84. The chamber 84 at least substantially receives the stator 46 and the rotor 48. The illustrated housing 40 further includes a first endshield 86 at one end of the motor chamber 84 and a second endshield 88 at the other end of the motor chamber 84. In the illustrated embodiment, each endshield 86 or 88 at least substantially spans and thereby encloses the corresponding end of the motor chamber 84, although an open endshield design (such as a spoked endshield) is permissible with respect to some aspects of the present invention. The motor shell 82 preferably extends between and interconnects that first and second endshields 86 and 88. Furthermore, a gasket 89 and o-ring 90 are preferably provided to seal the interfaces between the motor shell 82 and the first and second endshields 86 and 88, respectively (see FIGS. 9 and 10).

The housing 40 further preferably includes an end cover 91 and a box cover 92. The end cover 91 is removably attached to the endshield 88 and covers the encoder wheel 50. The box cover 92 is removably attached to a junction box 94 of the shell 82. The box cover 92 and box 94 cooperatively enclose wiring (not shown) and other electronic components (not shown) for operation of the motor assembly 34.

Turning to FIGS. 5-9, the endshields 86,88 cooperatively support the rotor 48 for rotation relative to the housing 40. The endshields 86,88 preferably present bearing mounting surfaces 95a,b to receive and support the bearings 81 (see FIGS. 9 and 10).

As will be appreciated, the endshield 86 preferably cooperates with the gear assembly 44 to provide a compact and durable motor assembly construction. The illustrated endshield 86 includes an outermost flange 96, an annular side wall 98, and a recessed base 100. The endshield 86 also presents an exterior mounting surface 102 that defines an annular pocket 104 (see FIGS. 6 and 9). As will be discussed, the endshield 86 is configured to support the gear assembly 44 and the wheel 26.

Gear Assembly

Turning to FIGS. 6-8, 10, and 11, the gear assembly 44 preferably provides a planetary gear drive configured to transmit rotational power from the motor 42 to the wheel 26. The illustrated gear assembly 44 produces a gear reduction that reduces the rotational speed output to the wheel 26. The gear assembly 44 preferably includes the drive gear 76, a ring gear 106, intermediate gears 108, and a carrier 110.

The carrier 110 preferably comprises a unitary frame to position the gears 76,106,108 in intermeshing engagement with one another. The carrier 110 includes an upstanding carrier shaft 112, a carrier base 114, and arms 116 that connect the shaft 112 to the base 114. The carrier shaft 112 includes a flange 118 and presents a bearing mounting surface 120 (see FIG. 6). The carrier base 114 presents a bearing mounting surface 122 spaced axially from the bearing mounting surface 120.

The mounting surfaces 120,122 preferably receive respective bearings 124,126 adjacent to opposite ends of the carrier 110 (see FIG. 10). Nevertheless, it is within the ambit of the present invention where the bearings 124,126 are alternatively located on the carrier 110. The bearings 124,126 each preferably comprise a sealed ball bearing assembly. However, for some aspects of the present invention, other suitable types of bearings (e.g., journal bearings, bushings, roller bearings, etc.) could be used.

Figure 6:
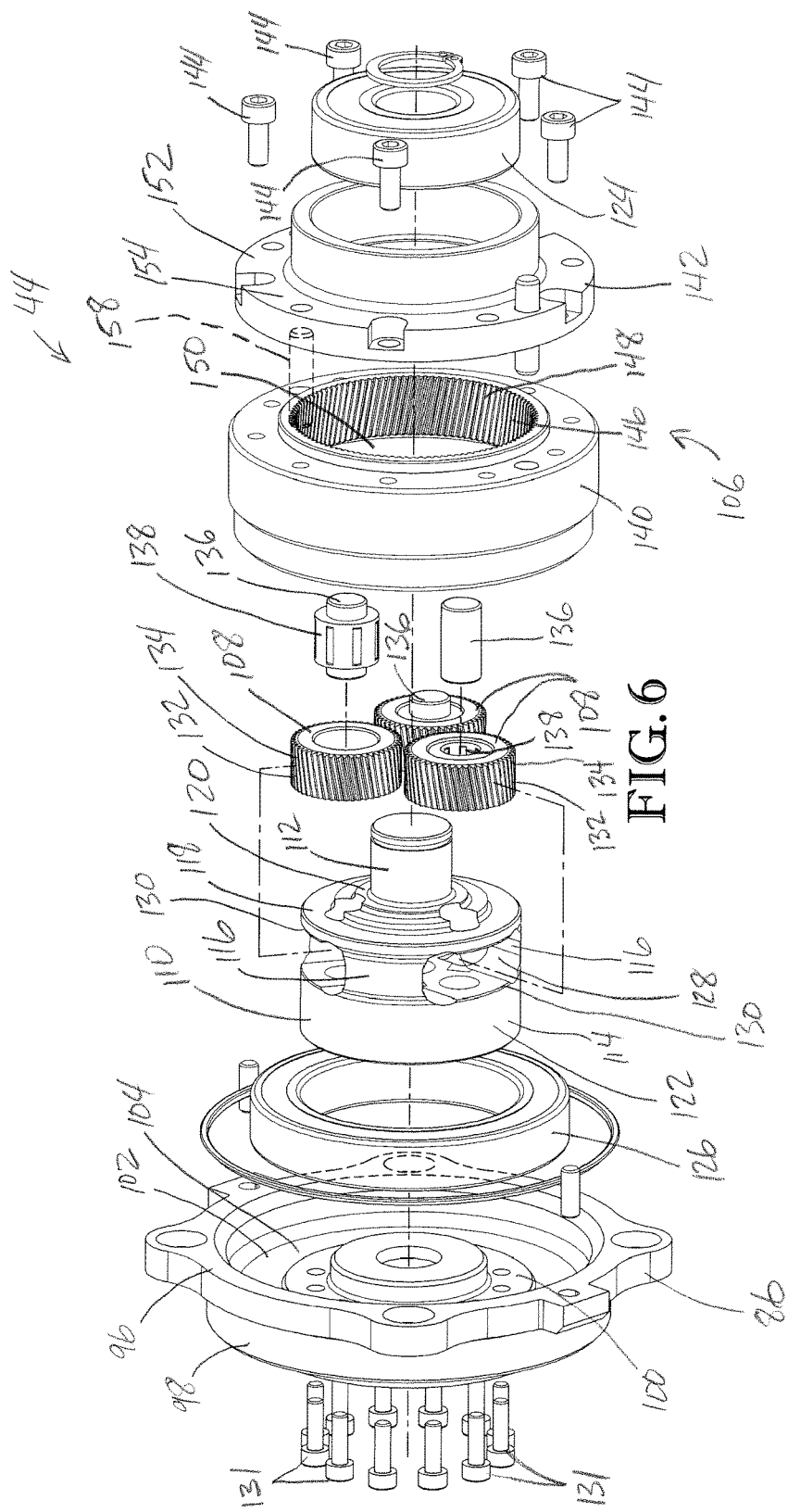
FIG. 6 is a fragmentary exploded view of the traction assembly shown in FIGS. 2-5, showing the gear assembly exploded to illustrate the ring gear, intermediate gears, carrier, and bearings of the gear assembly.
Figure 7:
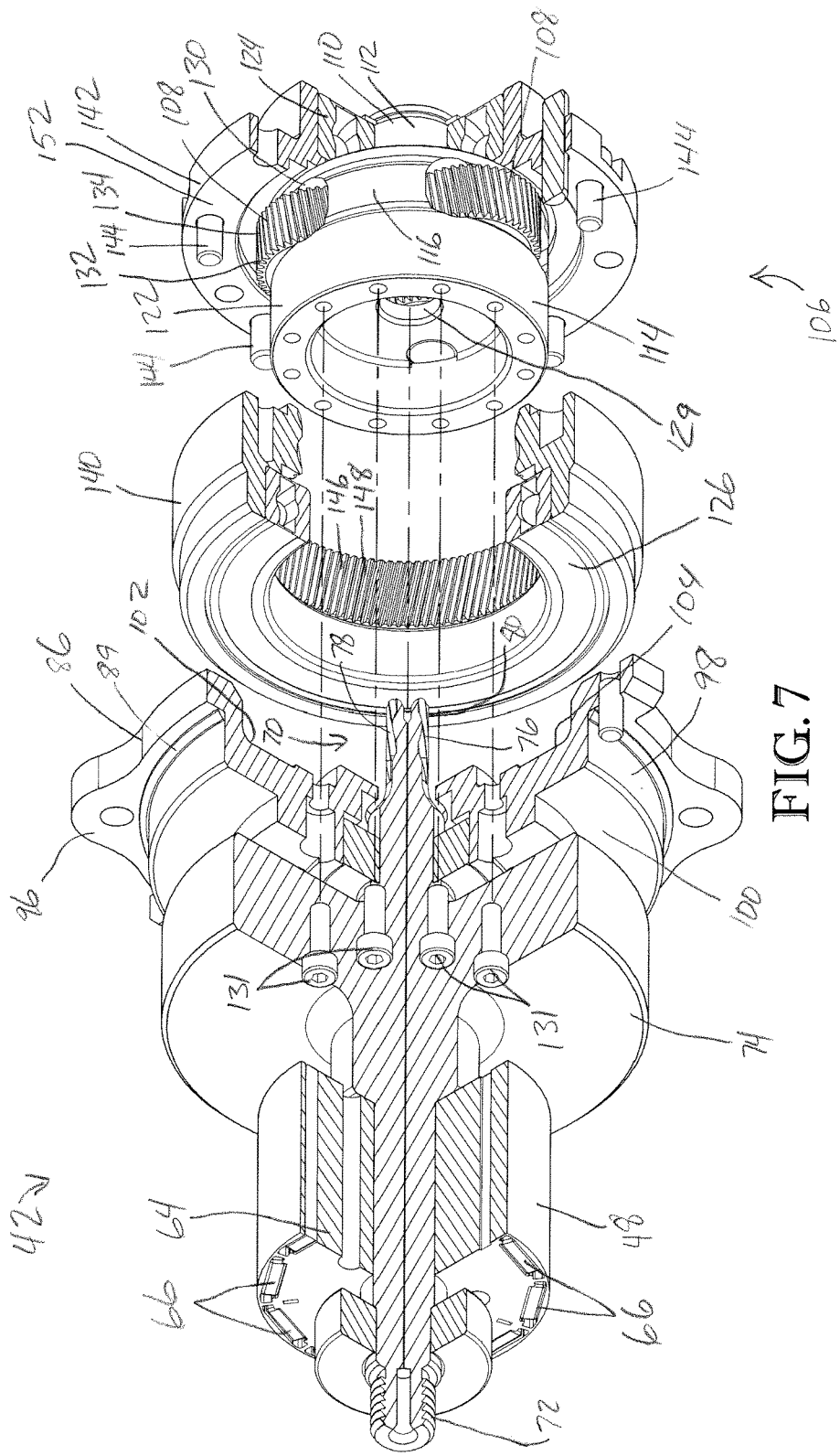
FIG. 7 is a fragmentary exploded view of the traction assembly shown in FIGS. 2-6, showing the gear assembly exploded from an adjacent endshield, with the rotor supported by a bearing mounted on the endshield and including a rotor core, motor shaft, and flywheel.
Figure 8:
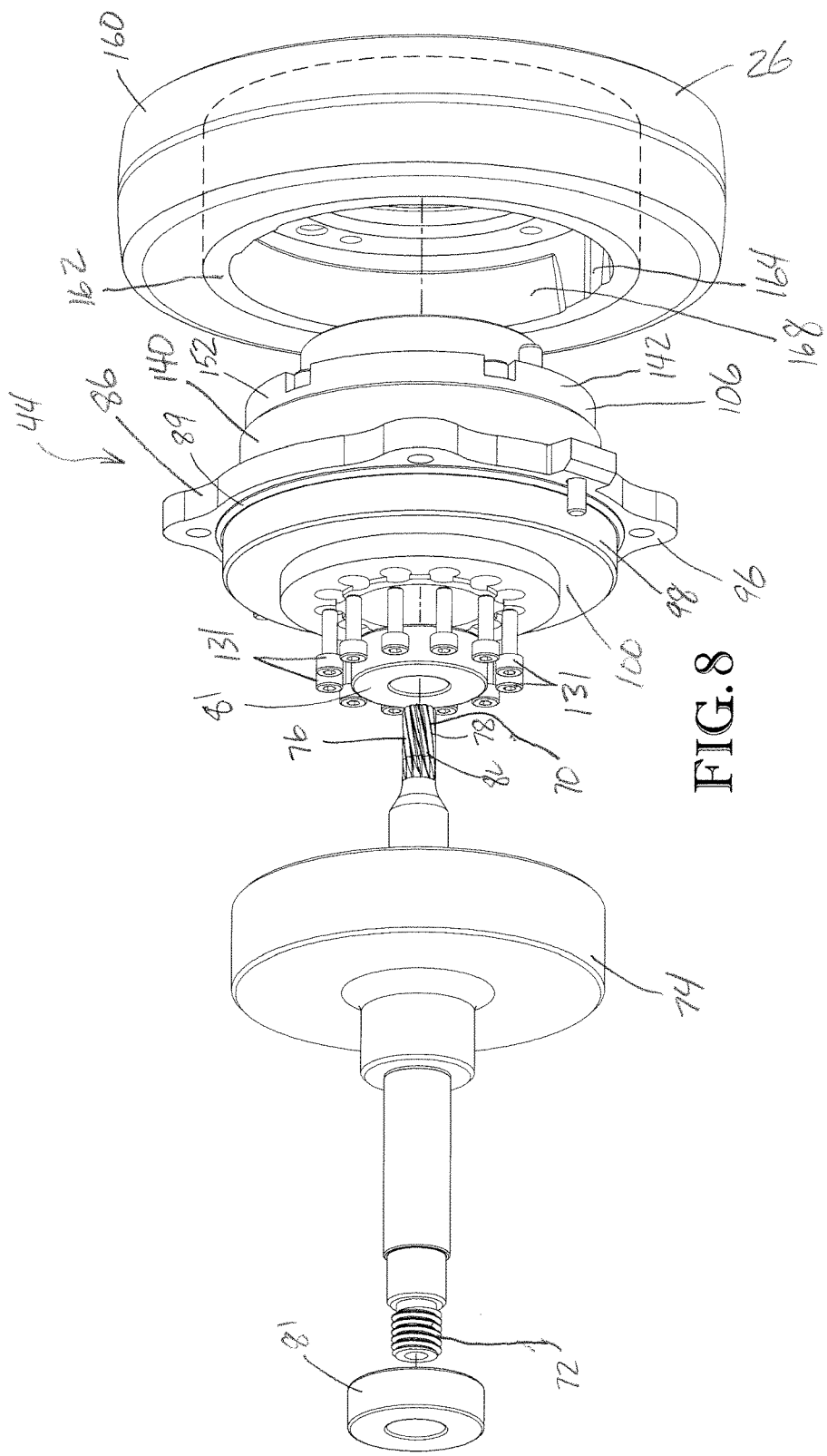
FIG. 8 is a fragmentary exploded view of the traction assembly shown in FIGS. 2-7, showing the motor shaft, and flywheel exploded from the adjacent endshield and the gear assembly, and further showing the wheel exploded from the gear assembly.
Figure 11:
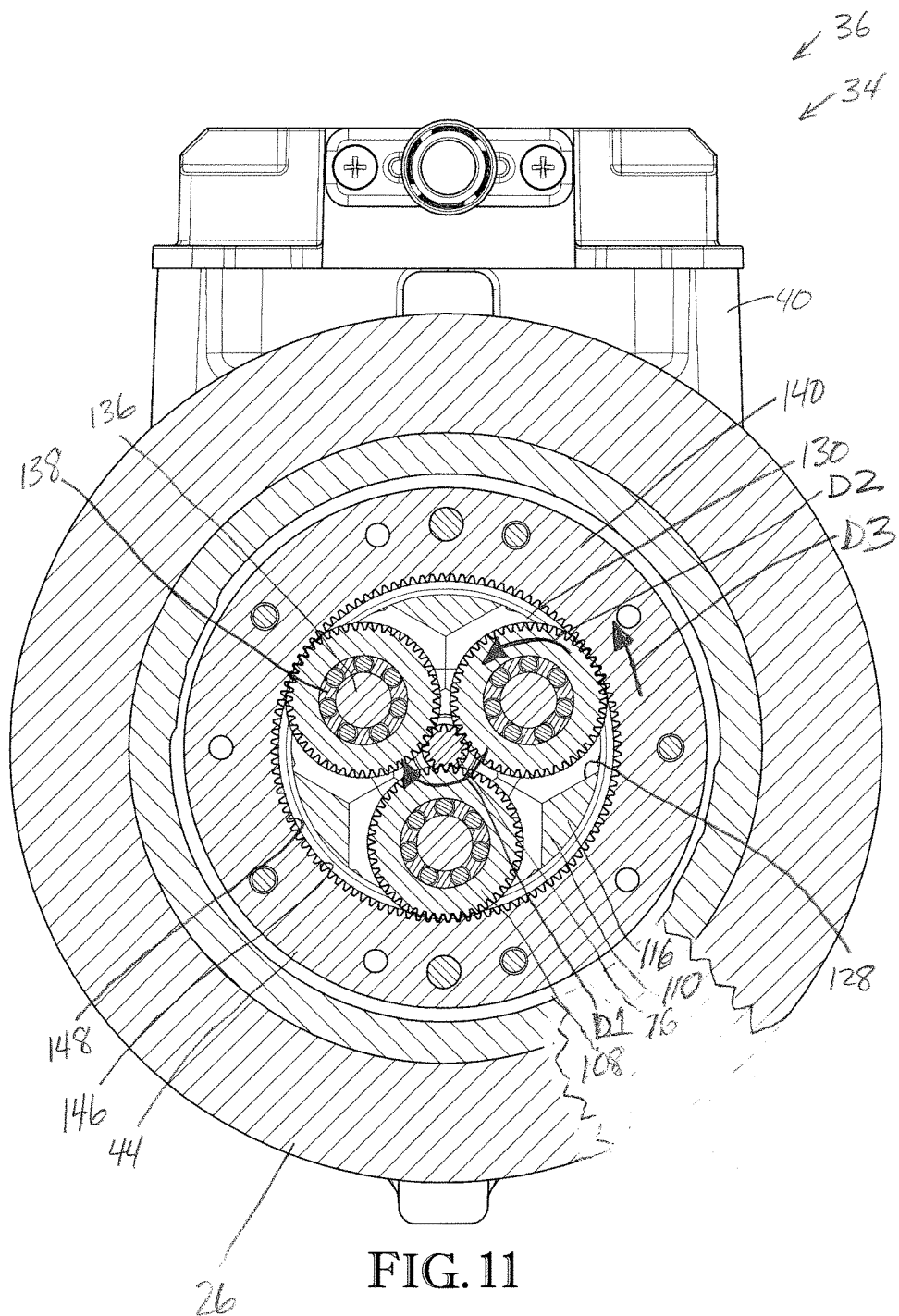
FIG. 11 is a fragmentary cross section of the traction assembly taken along line 11-11 in FIG. 9.

The carrier 110 defines a gear chamber 128 that receives the drive gear 76 and partly receives the intermediate gears 108 (see FIGS. 6 and 11). The carrier 110 also presents a central opening 129 and slotted openings 130 that communicate with the gear chamber 128. The central opening 129 is configured to receive the shaft 68 (see FIGS. 7 and 10). The slotted openings 130 are separated from one another by the arms 116. The slotted openings 130 permit the intermediate gears 108 to extend into and out of the gear chamber 128.

The illustrated carrier 110 is preferably fixed relative to the stator 46 so that the carrier 110 is stationary relative to the stator 46 and the housing 40. More preferably, in the illustrated embodiment, the carrier base 114 is removably secured to the endshield 86 with fasteners 131 (see FIGS. 9 and 10). As will be explained, securing the carrier 110 to the housing 40 causes the ring gear 106 to rotate relative to the carrier 110 in response to rotation of the drive gear 76.

In the illustrated embodiment, the carrier base 114 is partly received in the pocket 104 of the endshield 86 when secured thereto. It has been found that this construction enables the gear assembly 44 to be compactly mounted with the motor.

Preferably, the intermediate gears 108 drivingly connect the drive gear 76 and the ring gear 106. The illustrated gears 108 include respective helical teeth 132 that form corresponding toothed surfaces 134 (see FIG. 6), although the gears 108 could present an alternative tooth shape for intermeshing gear engagement.

Each intermediate gear 108 is preferably rotatably mounted on the carrier 110. In the illustrated embodiment, each gear 108 is located partly in the gear chamber 128 and projects through a respective slotted opening 130. In this manner, part of the gear 108 extends outside of the gear chamber 128 to be drivingly intermeshed with the ring gear 106.

Each gear 108 is rotatably mounted on a pin 136 and a roller bearing 138 (see FIGS. 6, 9, and 11). In the usual manner, the roller bearings 138 permit the gears 108 to spin smoothly relative to the carrier 110.

The gear assembly 44 preferably includes three (3) intermediate gears 108. However, it is within the ambit of the present invention where the gear assembly 44 employs an alternative number of intermediate gears 108, such as two (2) gears or four (4) gears. For some aspects of the present invention, the gear assembly 44 could also include a single intermediate gear.

Referring again to FIGS. 6-8, 10, and 11, the ring gear 106 is configured to be driven by the intermediate gears 108 so as to rotate the wheel 26. The ring gear 106 preferably includes a toothed component 140 and a hub component 142 that are removably secured to one another with fasteners 144 (see FIG. 6). For some aspects of the present invention, the ring gear could also have a unitary construction.

The toothed component 140 preferably includes helical teeth 146 that form an interior toothed surface 148 (see FIG. 6). However, it will be appreciated that the ring gear 106 could present an alternative tooth shape for intermeshing engagement with the intermediate gears 108. The toothed component 140 also presents an interior bearing mounting surface 150 to receive the bearing 126 (see FIG. 10).

The hub component 142 includes a flange 152 that presents a rim mounting surface 154 (see FIGS. 6 and 10). The hub component 142 also presents an interior bearing mounting surface 156 to receive the bearing 124. As discussed above, the bearings 124,126 are also mounted on respective mounting surfaces 120,122 of the carrier 110.

The bearing mounting surfaces 150,156 are preferably located adjacent to respective ends of the ring gear 106. As a result, each end of the ring gear 106 is rotatably supported by a respective bearing 124,126 to securely mount the ring gear 106 for rotation on the carrier 110 and permit the ring gear 106 to spin smoothly relative to the carrier 110. It will be understood that the bearings 124,126 could be alternatively positioned on the ring gear 106 without departing from the scope of the present invention.

The bearing mounting surfaces 150,156 are also preferably positioned on opposite sides of the toothed surface 148. With the ring gear 106 and the intermediate gears 108 in intermeshing engagement, the bearings 124,126 cooperatively support the ring gear 106 on both sides of the toothed surface 148 to maintain intermeshing engagement between the gears 106,108.

The ring gear 106 is spun in a counterclockwise driven direction D3 by selectively spinning the rotor 48 in a clockwise drive direction D1 (see FIG. 11). In particular, the drive gear 76 spins with the rotor 48 in the direction D1, which causes the intermediate gears 108 to spin in an opposite counterclockwise direction D2 (see FIG. 11). With the carrier 110 being fixed to prevent rotation thereof relative to the housing 40, the intermediate gears 108 cause the ring gear 106 to spin in the driven direction D3 (see FIG. 11).

Although the gears 76,106,108 are depicted as rotating in the corresponding directions D1,D2,D3 (as shown in FIG. 11), it will be appreciated that the motor could be reversed to spin the gears 76,106,108 in opposite directions. In such a reversed operation, the drive gear 76 spins counterclockwise and the gears 106,108 spin clockwise.

The illustrated gear assembly 44 preferably provides a gear ratio that ranges from about 5:1 to about 20:1 and, more preferably, is about 9:1. The principles of the present invention are equally applicable where the gear ratio associated with the gear assembly 44 is outside of the above-noted range.

The ring gear 106 is preferably sized and configured to be partly received in the pocket 104 presented by the endshield 86. Furthermore, as will be described, a rim of the wheel 26 preferably receives the ring gear 106. This arrangement serves to compactly position the gear assembly 44 and the wheel 26 relative to the housing 44.

Preferably, the ring gear 106, carrier 110, and bearings 124,126 cooperatively enclose the gears 76,106,108 of the gear assembly 44 and form an enclosed chamber 157 (see FIGS. 9 and 10). The enclosed chamber 157 fluidly communicates with the motor chamber 84 via the central opening 129.

The motor chamber 84 and enclosed chamber 157 are both preferably sealed relative to ambient to restrict contaminant ingress. The ring gear 106, carrier 110, bearings 124,126, and endshield 86 are preferably sealingly engaged with one another to maintain the chambers 84 and 157 in a sealed condition.

The wheel 26 is preferably mounted on the ring gear 106 and secured thereto with fasteners 158 (see FIG. 9). The wheel 26 includes a tire 160 and a rim 162 fixed to one another. The rim 162 presents an annular rim surface 164 that forms an opening 166 and a pocket 168 to partly receive the ring gear 106 (see FIGS. 8-10). The configuration of the wheel 26 and ring gear 106 permits the wheel 26 to be positioned closely adjacent the housing 40.

In use, the motor assembly 34 is operable to selectively drive the wheel 26 in the driven direction D3 by spinning the rotor 48 in the drive direction D1. As the rotor 48 spins, the drive gear 76 spins with the rotor 48 to spin the intermediate gears 108 in the direction D2, and the intermediate gears 108 spin the ring gear 106 and the wheel 26 in the driven direction D3.

Overhead Fan—Second Preferred Embodiment

Turning to FIGS. 12-16, an alternative motor assembly 200 is constructed in accordance with a second preferred embodiment of the present invention. For the sake of brevity, primarily the differences of motor assembly 200 compared to motor assembly 34 will be discussed herein.

The illustrated motor assembly 200 is particularly configured for use as part of an overhead fan 202, although the motor assembly 200 could be adapted for other applications. The overhead fan 202 also includes a fan assembly 204 that includes a fan hub 206 and a series of fan blades (not shown).

The motor assembly 200 is configured to have a compact construction while also providing a high output torque. The motor assembly 200 preferably includes an alternative housing 208, an alternative electric motor 210, and an alternative gear assembly 212.

The electric motor 210 preferably comprises an outer rotor motor that includes an alternative stator 214 and an alternative rotor 216 that circumscribes the stator 214 (see FIGS. 14 and 16). The stator 214 includes a series of annularly arranged stator teeth 218.

The rotor 216 includes a rotor can 220 (preferably formed of stamped metal) having a top circular-shaped wall 222 and a depending cylindrical wall 224 (see FIG. 16). The rotor 216 also includes a series of magnets 226 secured to the inside of the depending wall 224, in a circumscribing relationship to the stator teeth 218. The rotor 216 further includes a central motor shaft 228 secured to top wall 222 of the can 220. The shaft 228 is rotatably supported by bearings 230 and presents a drive gear 232 of the gear assembly 212 (see FIGS. 14-16). The rotor 216 is removably secured to a flanged end of the shaft 228 with fasteners 234.

Preferably, the gear assembly 212 includes the drive gear 232, a ring gear 236, intermediate gears 238, and an alternative carrier 240. The illustrated ring gear 236 includes a toothed component 242 and a hub component 244. The carrier 240 includes an alternative carrier shaft 246 and an alternative carrier base 248 that receive bearings 249 (see FIGS. 15 and 16).

Similar to gear assembly 44, the gear assembly 212 is configured to be powered by the motor 210 to drive the ring gear 236, which drives the fan assembly 204.

The housing 208 includes an upper cover 250, a lower housing section 252, a control board 254, and an endshield 256 (see FIG. 16). The upper cover 250 includes a central opening that securely receives a support rod (not shown) and wiring (not shown). The cover 250 and lower housing section 252 are provided with complemental, circumferentially extending flanges that are secured to one another with fasteners.

The endshield 256 is similar to endshield 86 and preferably includes an outermost flange 258, an annular side wall 260, and a recessed base 262 (see FIG. 16). The endshield 256 also presents an exterior mounting surface 264 that defines an annular pocket 266 (see FIG. 16). The endshield 256 also presents a bearing mounting surface 268 to receive the respective bearing 230.

The lower housing section 252 also preferably includes a side wall 272 and a base wall 274 that define a motor chamber 276 (see FIGS. 14 and 16). The base wall 274 includes a base portion 278, an exterior mounting portion 280, and an interior mounting portion 282 (see FIG. 14). The exterior mounting portion 280 projects downwardly from the base portion 278 and is configured to be secured to the endshield 256 with fasteners 284.

The interior mounting portion 282 supports the respective bearing 230 and the stator 214. The stator 214 is preferably fixed to the interior mounting portion 282. The interior mounting portion 282 is annular and projects upwardly from the base portion 278. The interior mounting portion 282 presents an end that forms a bearing mounting surface 286 to receive the respective bearing 230 (see FIGS. 14 and 16).

Due to the construction of the housing 208, the lower housing section 252 and the endshield 256 attached thereto support the bearings 230 and the rotor 216. That is, the rotor 216 is not rotatably supported between opposite endshields.

CONCLUSION

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An electric motor assembly comprising:
   a rotor rotatable about a rotor axis;
   a stator;
   a gear assembly including—
      a drive gear,
      a ring gear at least substantially circumscribing the drive gear,
      an intermediate gear disposed between and engaging each of the drive gear and the ring gear, and
      a carrier supporting the intermediate gear, said carrier being fixed relative to the stator so as to be stationary relative thereto,
said ring gear being rotatable relative to the carrier and the stator,
said rotor including a flywheel,
said rotor further including a shaft,
said shaft including axially opposed shaft ends,
said flywheel being disposed axially between the shaft ends.

2. The electric motor assembly of claim 1,
said assembly further comprising a housing defining a motor chamber at least substantially receiving the rotor and the stator,
said stator and said carrier being fixed relative to the housing.

3. The electric motor assembly of claim 2,
said housing at least in part circumscribing the carrier.

4. The electric motor assembly of claim 2,
said housing including an endshield rotatably supporting the shaft,
said carrier being fixed directly to said endshield.

5. The electric motor assembly of claim 4,
said stator at least substantially circumscribing said rotor.

6. The electric motor assembly of claim 4,
said housing further including a support structure at least in part disposed axially between the stator and the endshield,
said endshield and said stator each being fixed directly to said support structure.

7. The electric motor assembly of claim 6,
said rotor at least substantially circumscribing said stator.

8. The electric motor assembly of claim 1,
said carrier defining a gear chamber at least in part receiving the intermediate gear.

9. The electric motor assembly of claim 1,
said ring gear including a plurality of teeth presenting a toothed surface and configured to intermesh with complementary structure defined by the intermediate gear.

10. The electric motor assembly of claim 1,
said electric motor assembly further comprising a wheel fixed relative to the ring gear to rotate therewith.

11. The electric motor assembly of claim 10,
said wheel presenting a wheel axis of rotation that is coaxial with the rotor axis.

12. The electric motor assembly of claim 10,
said electric motor assembly further comprising a hub fixed to said wheel, with the hub being provided by the ring gear.

13. The electric motor assembly of claim 1,
said carrier being at least substantially coaxial with the stator.

14. The electric motor assembly of claim 1,
said shaft presenting the drive gear.

15. The electric motor assembly of claim 1,
said gear assembly including three of said intermediate gears.

16. The electric motor assembly of claim 1,
said gear assembly having a 9:1 gear ratio.

17. The electric motor assembly of claim 1,
said rotor further including a rotor core,
said flywheel being disposed axially between the rotor core and the gear assembly.

18. The electric motor assembly of claim 17,
said flywheel being integrally formed with the shaft.

19. An electric motor assembly comprising:
a rotor rotatable about a rotor axis;
a stator;
a gear assembly including—
  a drive gear,
  a ring gear at least substantially circumscribing the drive gear,
  an intermediate gear disposed between and engaging each of the drive gear and the ring gear, and
  a carrier supporting the intermediate gear,
  said carrier being fixed relative to the stator so as to be stationary relative thereto,
  said ring gear being rotatable relative to the carrier and the stator,
said ring gear including a plurality of teeth presenting a toothed surface and configured to intermesh with complementary structure defined by the intermediate gear,
said electric motor assembly further comprising a first bearing rotatably supporting the ring gear on the carrier,
said ring gear presenting a first mounting surface engaging the first bearing.

20. The electric motor assembly of claim 19,
said electric motor assembly further comprising a second bearing rotatably supporting the ring gear on the carrier,
said ring gear presenting a second mounting surface engaging the second bearing.

21. The electric motor assembly of claim 20,
said toothed surface being disposed axially between said first and second mounting surfaces.

22. The electric motor assembly of claim 19,
said ring gear including discrete first and second components respectively presenting the toothed surface and the first mounting surface.

23. The electric motor assembly of claim 19,
said rotor including a flywheel.

24. An electric motor assembly comprising:
a rotor rotatable about a rotor axis;
a stator;
a gear assembly including—
  a drive gear,
  a ring gear at least substantially circumscribing the drive gear,
  an intermediate gear disposed between and engaging each of the drive gear and the ring gear, and
  a carrier supporting the intermediate gear,
  said carrier being fixed relative to the stator so as to be stationary relative thereto,
  said ring gear being rotatable relative to the carrier and the stator,
said rotor including a flywheel,
said rotor further including a shaft,
said flywheel being integrally formed with the shaft.

25. The electric motor assembly of claim 24,
said shaft including axially opposed shaft ends,
said flywheel being disposed axially between the shaft ends.

26. The electric motor assembly of claim 24,
said rotor further including a rotor core,
said flywheel being disposed axially between the rotor core and the gear assembly.

27. An electric motor assembly comprising:
a rotor rotatable about a rotor axis;
a stator;
a gear assembly including—
  a drive gear, a ring gear at least substantially circumscribing the drive gear,
an intermediate gear disposed between and engaging each of the drive gear and the ring gear, and
a carrier supporting the intermediate gear,
said carrier being fixed relative to the stator so as to be stationary relative thereto,
said ring gear being rotatable relative to the carrier and the stator,
said rotor including a flywheel,
said rotor further including a rotor core,
said flywheel being disposed axially between the rotor core and the gear assembly.

\* \* \* \* \*